UNITED STATES PATENT OFFICE.

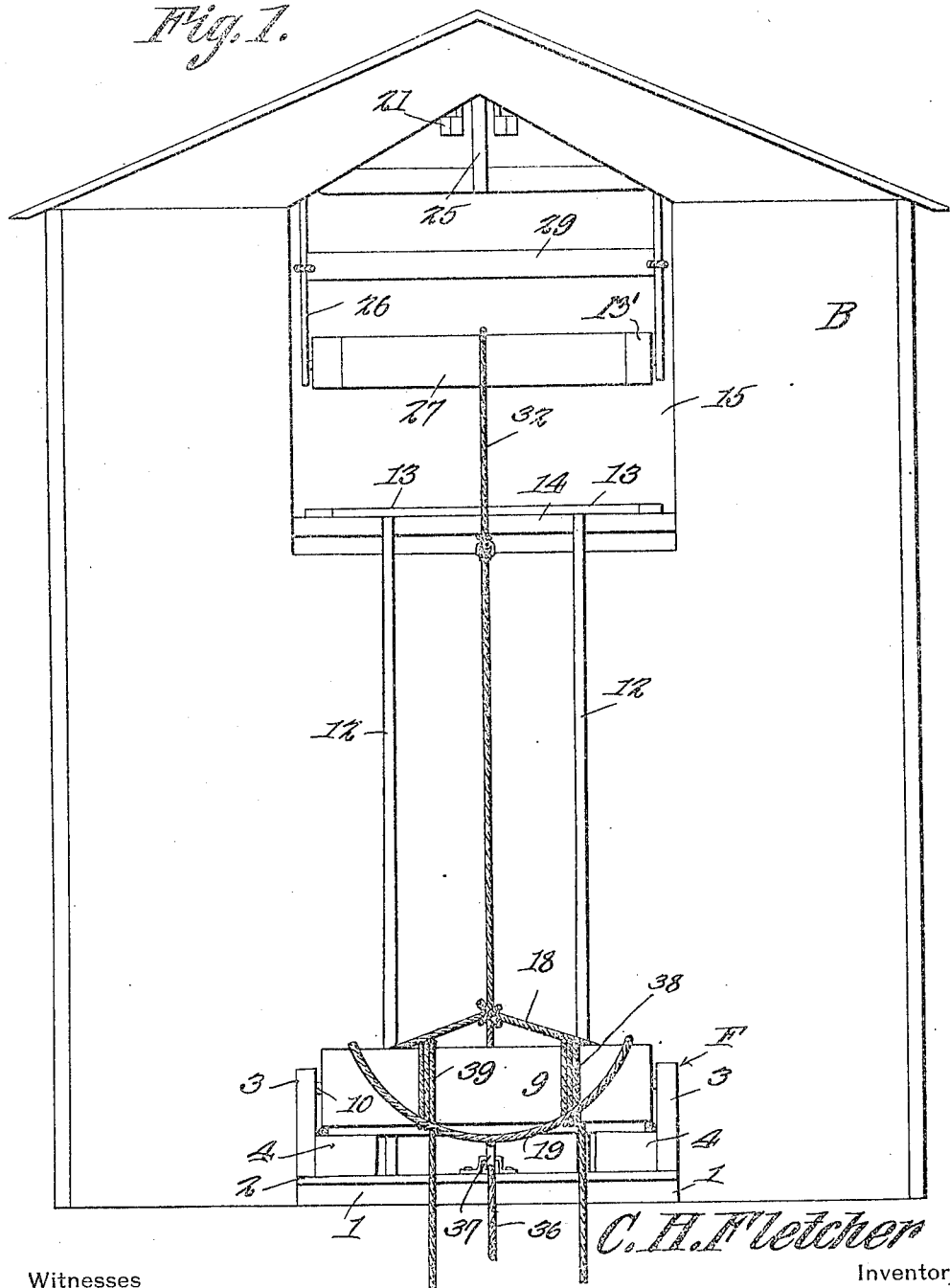

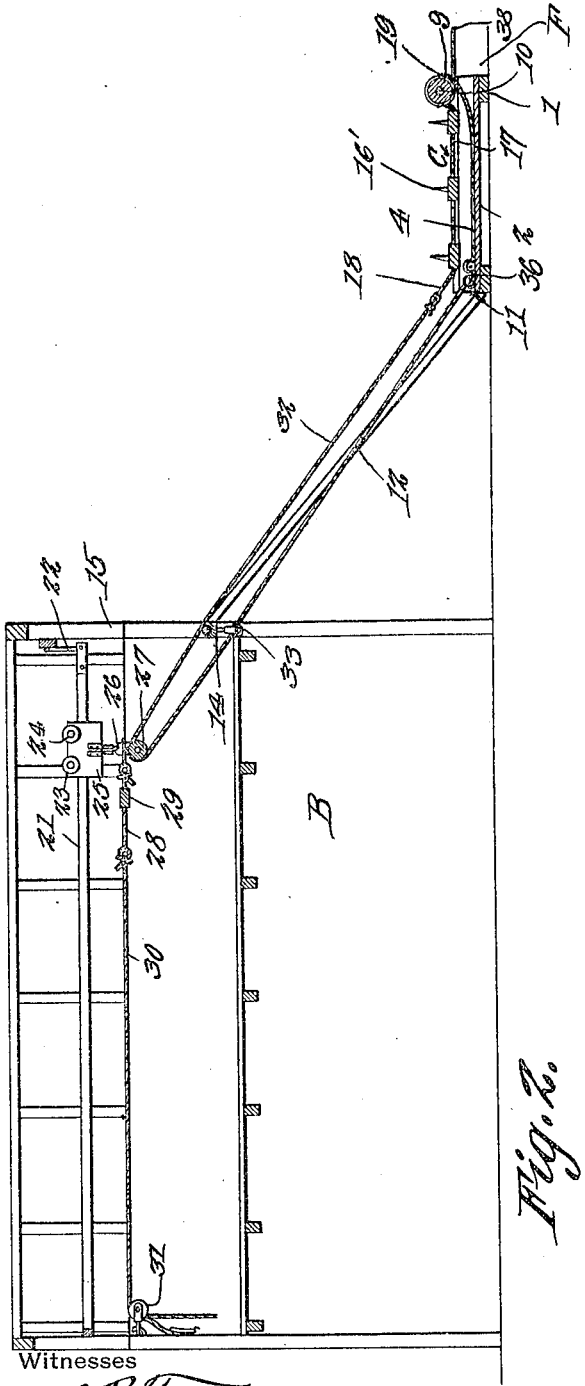
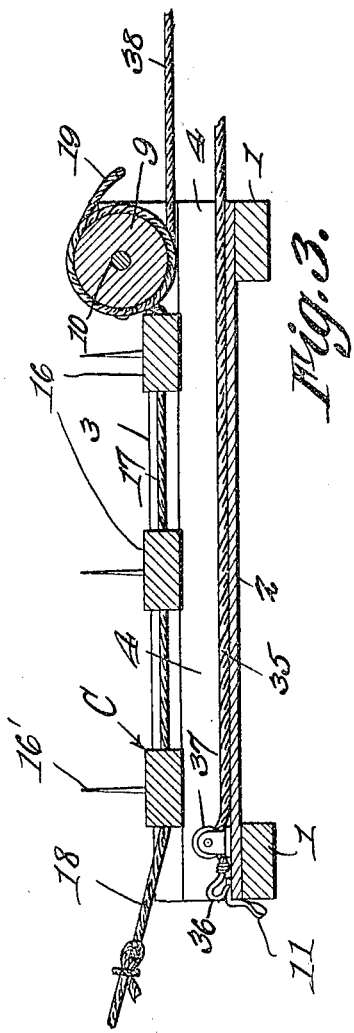

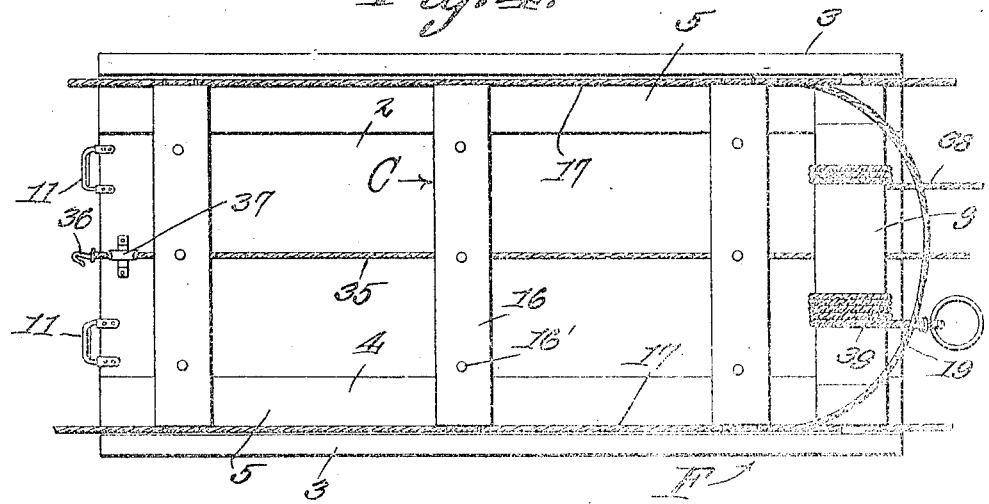
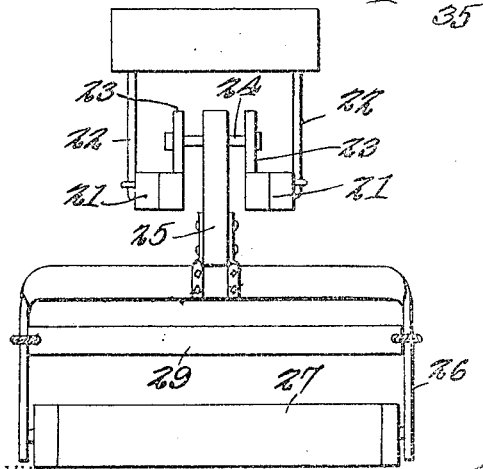
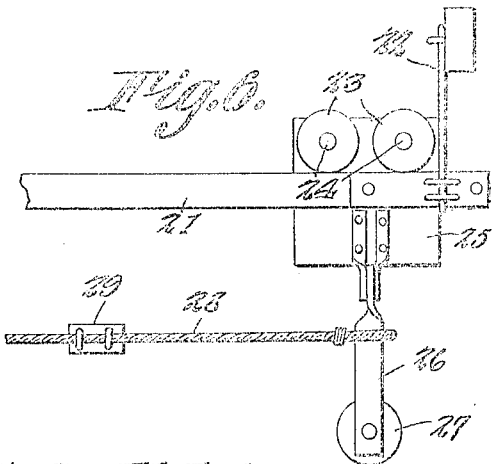

CHARLES HENRY FLETCHER, OF ORRICK, MISSOURI.

HAY-UNLOADER.

1,291,462.      Specification of Letters Patent.      Patented Jan. 14, 1919.

Application filed December 4, 1917. Serial No. 205,364.

*To all whom it may concern:*

Be it known that I, CHARLES HENRY FLETCHER, a citizen of the United States, residing at Orrick, in the county of Ray and State of Missouri, have invented a new and useful Hay-Unloader, of which the following is a specification.

The subject of this invention is a hay unloader wherein a hay receiving rack is coöperatively associated with hay elevating mechanism, and the objects of the invention are first, to provide a rack for receiving the hay and a conveyer situated in the rack, second, to provide a novel form of conveyer, third, to provide adjustable means for operating the conveyer, fourth, to provide a novel adjustable hanger for supporting the conveyer, fifth, to provide a simple and efficient unloader.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

A practical embodiment of the invention is shown in the accompanying drawings, wherein:

Figure 1 is a front elevation of the device in operative position.

Fig. 2 is a central longitudinal section.

Fig. 3 is a detail longitudinal section of the frame.

Fig. 4 is a plan view of the frame.

Fig. 5 is a rear elevation of the frame.

Fig. 6 is a side elevation of the hanger.

Fig. 7 is a front elevation of the same.

Referring to the drawings by characters of reference:

A barn is represented generally at B, while an unloader frame adapted, when the device is in operation, to be situated in front of the barn, as shown most clearly in Figs. 1 and 2, is indicated at F.

The unloading frame consists of the end sills 1 upon which are secured the floor boards 2. Sides 3 rise from each end of the end sills, upon which they rest, and secured to the end sills within each side is a longitudinal beam 4 which serves to connect the end sills and also as a support for the side pieces, which may be nailed or otherwise connected to them, and which form a rest for one of the unloaders as will be hereinafter fully set forth.

Extending transversely of the front end of the frame F is a roller 9, the shaft 10 of which is journaled in the sides 3 of said frame. This roller is situated between the upper and lower rests or beams 4.

On the rear end of the frame F the stirrups 11 are secured and serve to detachably support the lower ends of bars 12 the upper ends of which terminate adjacent a roller 13 and are held in notches formed in a bar 14 in which the roller 13 is journaled. The bar 14 extends across the loft window 15 of the barn 13, as seen most clearly in Figs. 1 and 2. The rollers 13 may be bound by metal rings 13' to keep the rollers from splitting. As will be readily understood from the drawings, these bars 12 form a skidway over which the unloaders or conveyers travel.

The conveyer C is formed of a series of transverse bars 16 which are joined together by a rope 17 and from which rise the spaced teeth or prongs 16'. The rope 17 is extended along each side of the conveyer and is secured to the ends of the bars 16 in any suitable and convenient manner, not shown, and forms a loop 18 at one end of the conveyer. The rope 17 also forms a loop 19 at the other end of the conveyer.

Spaced bars 21 forming a track, are arranged longitudinally of the loft of the barn B in which they are supported in any suitable manner, as by means of hangers 22 which are suspended from convenient points on the frame work of the barn loft.

Rollers 23 are positioned to travel on the spaced bars 21 and these rollers turn on axles 24 which pass through and suspend a block 25 between the bars 21. Secured to the depending edge of block 25 is a yoke 26 which underlies and is arranged transversely of the track. A roller 27 is journaled in the lower ends of the side arms of the yoke 26.

A yoke of any suitable material and construction, but here shown as composed of a rope 28 held in position by a spacing bar 29 to the ends of which it is suitably connected, is secured to the yoke 26 and extends rearwardly thereof. A rope 30 is secured to this rearwardly extending yoke and passes over a pulley 31 which is secured at the rear end of the barn.

As will be understood, the rope 30 may be drawn over the pulley 31 to bring the yoke 26 to any desired position on the track and the rope 31 secured by any well known fastener, not shown, to prevent the yoke 26 moving forward.

A rope or cable 32 is secured to the loop 18 of the conveyer C and is led over the bar 14 and roller 27. From the roller 27 the rope 32 is led downwardly over a pulley 33 which is suspended from the bar 14 and back to the frame F. A ring 34 may be provided at the free end of the rope 32.

A rope 35 is extended along the bottom of the frame F and a hook 36 is secured to the rear end of this rope. The rope 35 passes under a pulley 37 which is fastened to the bottom of the frame at its rear end.

A rope 38 is secured to the roller 9 at one end and after making a suitable number of turns about the roller is led from beneath the same and forwardly of the frame. Another rope 39 is secured to the roller 9 adjacent the other end thereof and is led from above the roller and forwardly of the frame F.

In practice the device is operated as follows: The frame is placed in position in front of the barn with the conveyer in place therein. The yoke 26 is drawn to the desired position on the track and anchored there by fastening the end of rope 30 in any suitable manner.

The rope 32 is then brought up over the roller 27 and pulley 33 and the ring 34 fastened in the hook 36 of rope 35. The bars 12 are placed in position and a horse hitched to the forward end of rope 35. The horse is then driven forward drawing the ropes 35 and 32 under the pulley 37 and through the frame F.

When the parts have been brought to the position just described the rope 35 is detached from the rope 32 and the rope 32 secured to the loop 19 of the conveyer C. A belt is thus formed by the rope 32 and the conveyer C, which belt extends about the rollers 9 and 27.

The horse may now be hitched to rope 38 and, after hay has been deposited on the conveyer C, driven forward to unwind the rope 38 and revolve the roller 9. This will cause the rope 32 and conveyer C to move so that the conveyer is drawn along the skidway to the loft and over the roller 27. After passing over the roller 27 the conveyer C is upside down and consequently, dumped, as will be readily understood.

During the foregoing operation the rope 39 has been wound upon the roller 9 and this rope or cord may now be drawn forward to revolve the roller 9 in the reverse direction and bring the conveyer C back to the frame F, ready for another load.

It will be understood, of course, that the number of conveyers which may be used is immaterial, one being herein shown as constituting a convenient structure.

Having thus described the invention, what is claimed as new and sought by Letters Patent, is:

1. A hay unloader, comprising a frame, supports in the frame, a conveyer on the supports, bars adapted to be extended from the frame to the loft of a barn to form a skidway, a support, a yoke depending from the support and movable transversely thereof toward and away from the skidway, means engaging the yoke and the conveyer to draw the conveyer from the frame to the yoke to deposit material, and means for returning the conveyer to the frame.

2. A hay unloader, comprising a frame, supports in the frame, a conveyer mounted on the supports, bars rising from the frame at one end thereof to form a skidway, a track above the skidway, a yoke depending from the track and adjustable thereon, a roller in the frame, means engaging the roller and the yoke for elevating the conveyer, and means for actuating the roller to elevate the conveyer.

3. A hay unloader, comprising a frame, a conveyer mounted in the frame, a skidway rising from the frame, a track above the skidway, a yoke depending from the track and adjustable thereon, a roller in the yoke, a rope passing over the roller and connected to the conveyer, and means in the frame for elevating the conveyer along the skidway and over the roller.

4. A hay unloader, comprising a conveyer, a track, a yoke depending from the track and adjustable thereon, a yoke secured to the first mentioned yoke and extending rearwardly thereof, a roller in the first mentioned yoke, means connected to the second yoke for securing the yokes in adjusted position, and means for elevating the conveyer and drawing it through the yokes.

In testimony that I claim the foregoing as my own I have hereto affixed my signature in the presence of two witnesses.

CHARLES HENRY FLETCHER.

Witnesses:
C. M. DONOVAN,
J. K. FLETCHER.

Copies of this patent may be obtained for five cents each, by addressing the "Commissioner of Patents, Washington, D. C."